United States Patent [19]
Munyon

[11] 3,765,996
[45] Oct. 16, 1973

[54] UNIDIRECTIONAL TENSILE TEST SPECIMEN INCORPORATING INTEGRATED LOAD PADS

[75] Inventor: Henry Lawrence Munyon, San Diego, Calif.

[73] Assignee: Whittaker Corporation, Los Angeles, Calif.

[22] Filed: Apr. 3, 1972

[21] Appl. No.: 240,552

[52] U.S. Cl............... 161/39, 73/95, 73/103, 160/386, 161/116, 161/60, 161/149
[51] Int. Cl............... B32b 3/00, G01n 3/00
[58] Field of Search............... 73/95, 103; 24/243 P, 243 FS; 160/382, 386; 269/116, 269/55; 161/39, 116, 149, 60, DIG. 4

[56] References Cited
UNITED STATES PATENTS

| 327,627 | 10/1885 | Webb | 73/103 |
|---|---|---|---|
| 3,203,849 | 8/1965 | Katz et al. | 161/DIG. 4 |
| 3,691,000 | 9/1972 | Kalnin | 161/60 |

OTHER PUBLICATIONS

Symposium on Tension Testing of Non-Metallic Materials A.S.T.M. Pub. 194, 1956, page 13

Primary Examiner—George F. Lesmes
Assistant Examiner—R. J. Roche
Attorney—Donald E. Nist et al.

[57] ABSTRACT

A test specimen which is particularly suitable for testing the tensile strength of high strength, but brittle fibers incorporated in a resin matrix in unidirectional laminates. Each test specimen comprises a flat, unidirectional laminate with integrated loading pads at each end of the unidirectional laminate. The loading pads are made integral with the unidirectional laminate by: (1) employing substantially the same resin in the pads as is present in the flat laminate; (2) employing different reinforcing within each pad with the fibers on the inner side of each pad being the same as those present in the unidirectional laminate and with the fibers on the outer side of each pad being formed from generally high strength, non-brittle material to withstand the crushing action of test machine jaws; and (3) by assembling the uncured components of the specimen and curing them in a single curing step without an additional adhesive.

The ratio of brittle/non-brittle fibers in the pads is between about 1:2 and about 2:1.

10 Claims, 4 Drawing Figures

Patented Oct. 16, 1973 3,765,996
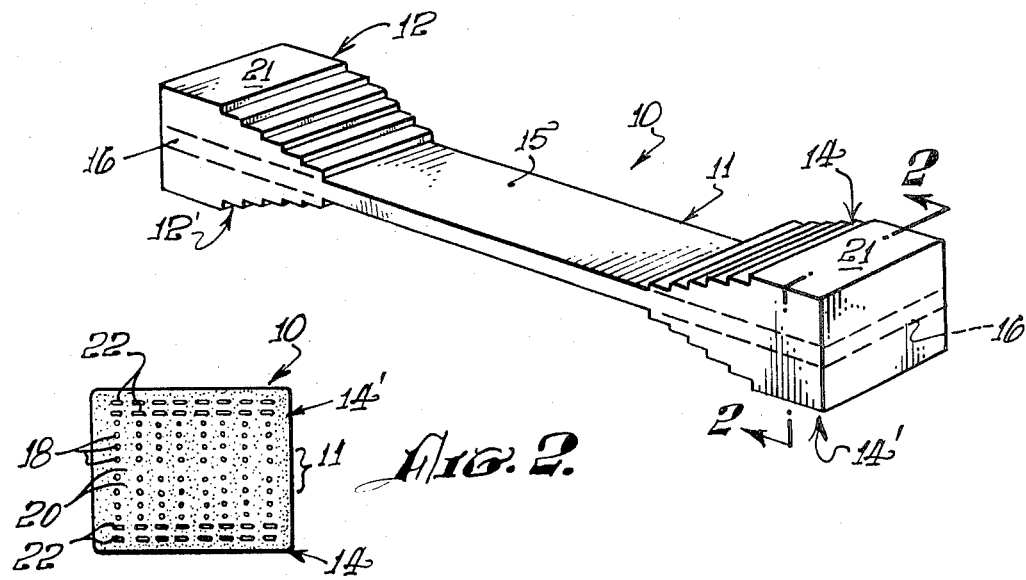
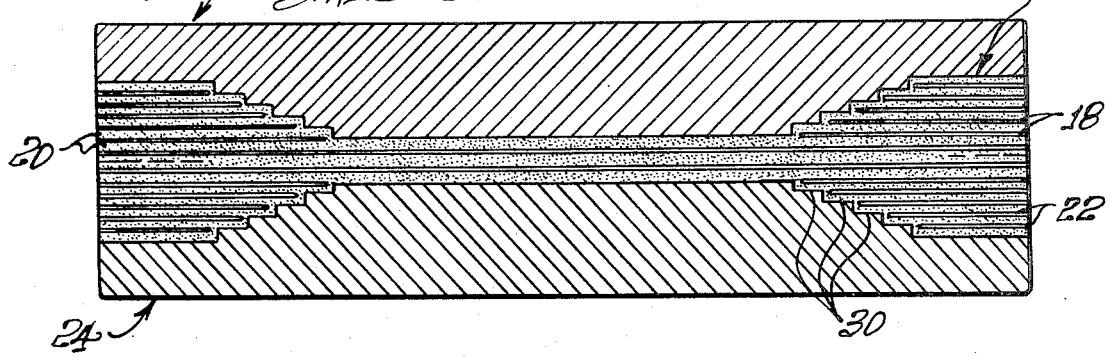
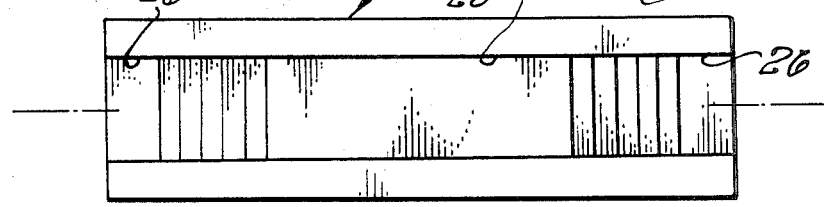

UNIDIRECTIONAL TENSILE TEST SPECIMEN INCORPORATING INTEGRATED LOAD PADS

BACKGROUND OF THE INVENTION

This invention relates to test specimens employed to test the tensile strength of fiber-reinforced plastic laminates and, more particularly, relates to such specimens which are employed to test laminates containing high strength, but brittle fibers.

In the prior art tensile testing of high strength, but brittle fibers, such as boron and graphite, in resin matrices, it has been found necessary to add load pads to each side of each end of the specimens to prevent fracturing of the brittle fibers by the test machine jaws. These load pads have comprised resin systems reinforced with fibers which are not brittle. The test specimens are made by first laying up and curing a unidirectional laminate in which the brittle fibers serve as the reinforcement. The pads are prepared in a separate lay-up and curing operation. Thereafter, the pads are bonded to the ends of the brittle fiber laminate using a suitable adhesive.

This prior art technique has several disadvantages. One disadvantage is that it requires several independent steps (lay-ups, cures, bonding) to produce the test specimen. In addition to the time consumed by each of these steps, a greater chance for undesired specimen failure (e.g., shear or flexure) is introduced by the possibility that any one of these steps may not be performed properly. Such undesired specimen failure, of course, results in erroneous test data.

Unsatisfactory data also results from the use of different resins in the undirectional test laminate and pads, particularly when tensile data is to be obtained over a wide temperature range. Since different resins are usually affected differently by changes in temperature, a large variation in the data from the expected tensile/temperature curve is often produced. Even if the same resin is used in the pads and unidirectional laminate, the use of an adhesive to bond these two components together produces a substantial and non-uniform spread from the "true" data since its temperature characteristics differ from the resin in the pads and test laminate. Selection of adhesives for particular test temperature ranges has not been completely satisfactory.

A further disadvantage with prior art tensile specimens is that it is difficult to consistently obtain fracture of the specimens in the gauge area, i.e., the area between the pads. Instead, these specimens have a marked tendency to fracture at the juncture of the curved surface with the unidirectional laminate thereby giving inconsistent and inaccurate results.

From the foregoing, it will be evident that there is a present need for new tensile test specimens for use in the testing of high strength, but brittle fibers.

SUMMARY OF THE INVENTION

The tensile test specimens of this invention have loading pads which are made integral with the unidirectional laminate by (1) using substantially a single resin throughout the test specimen, (2) laying up and curing the components of the test specimen in one operation, and (3) by including in the pads, as reinforcement, both the brittle fibers which are being tested and other fibers which are not brittle, with the brittle fibers being disposed on the inner side of the pads and with the non-brittle fibers being disposed on the outer side of the pads.

The high strength, brittle fiber tensile specimens produced as described herein perform substantially as a homogeneous unit while resisting the crushing faces of tensile test machine jaws. That is, the performance characteristics of the pads are substantially the same as those of the brittle fiber laminate so that failure of the specimens in each case occurs in the unidirectional laminate between the pads (in the gauge length) and, for very high strength fibers, is complete in the sense that the specimen shatters or totally fails. This is true even though the test temperatures may vary over a wide range. The net result is that the test values obtained are, as compared with tensile values obtained by prior art methods, substantially closer to the true tensile strength of the laminates. Furthermore, test repeatability is very good.

At relatively low load levels, the primary advantages obtained from use of the herein-described specimens lie in the ease of fabrication with its attendant savings in time, equipment, and cost and in specimen reliability which results in improved reproducibility of data. As the load levels increase, an additional advantage is obtained. That advantage derives from the mode of failure of the herein-described specimens. Even at loads well in excess of 4,000 lb., these specimens fracture between the test gauge points (often exemplified by total specimen failure) rather than at the pads as is generally the result when using bonded load pads.

DESCRIPTION OF THE DRAWING

FIG. 1 is a perspective view of a tensile test specimen of this invention.

FIG. 2 is a cross-sectional view taken through one end of a tensile test specimen along the line 2—2 of FIG. 1.

FIG. 3 is a side cross-sectional view of a mold employed to produce the herein-described specimens showing reinforced plies laid up therein prior to curing.

FIG. 4 is a top plan view of the lower mold plate of FIG. 2 showing the cavity into which plies are laid to produce the test specimens.

DESCRIPTION OF THE PREFERRED EMBODIMENT

Referring now to the Figures, and particularly to FIG. 1 and 2, the numeral 10 designates a tensile test specimen of this invention. Although the tensile test specimen 10 is of unitary construction, for ease and clarity of description it will herein be described as comprising a unidirectional laminate 11 extending the length of the test specimen with pads 12,12', 14,14[1] disposed on both sides of the laminate adjacent both its ends. The unidirectional laminate 11 is of standard rectangular design with a center section 15 and end sections 16 (shown in dotted outline in FIG. 1).

The unidirectional laminate 11 itself comprises reinforcement fibers 18 (FIG. 2) disposed unidirectionally within a resin matrix 20 so that the fibers 18 extend the length of the test specimen 10. Examples of the high strength, brittle fibers 18 present in the unidirectional laminate inlcude graphite which has a filament tensile strength on the order of 250,000 psi and up and boron which has a filament tensile strength of about 500,000 psi.

The pads 12,12¹, 14,14¹ are preferably identical to each other and will be so described with reference to the pad designated by the numeral 14. The sides of the pad 14 generally conform to the sides of the unidirectional laminate end section 16, but its face has a stepped configuration which functions to minimize stress concentrations. While it would be preferable for the face of the pad 14 to define a smooth curve, this is not warranted by the difficulties in producing such a form. The end-most step of the pad 14 serves as a load-bearing surface 21 for engagement by the jaws of a test machine (not shown).

The pad 14 comprises a resin matrix 20 of substantially the same and, preferably, the same resin as that in the unidirectional laminate 11 with reinforcing fibers disposed therein. The reinforcing fibers are of two types characterized by different physical properties. The reinforcing fibers 18¹ disposed within the pad 14 closest to the unidirectional laminate 11 are (inner) fibers formed of the same material as the fibers 18 which are present in the unidirectional laminate 11. However, the reinforcing fibers 22 disposed within the pad 14 furthest from the unidirectional laminate 11 are fibers which are formed from high strength materials which are not brittle and which are not fractured by the test machine jaws at the gripping pressures encountered in producing tensile fracture of the test specimen 10. Glass fibers having a tensile strength of about 200,000–220,000 psi have been successfully used as the outer fibers 22.

In general, there should be sufficient plies of brittle fibers 18¹ in the pad 14 to provide, in effect, a continuity of material properties through the unidirectional laminate 11 and into the pad. That is, there should be sufficient brittle fibers 18¹ in the pad 14 to thereby extend the characteristics of the unidirectional laminate 11 into the pad to make the latter function substantially as an extension of the former with the exception of the greater resistance to crushing forces provided by the non-brittle fibers 22.

It has been found that a ratio of at least one brittle ply to two non-brittle fiber plies is required to obtain acceptable results. Below this ratio, low tensile values are obtained with poor reproducibility with specimen fracture occurring mainly at the juncture of the gauge area and the pads. Preferably, a ratio of two brittle reinforcement plies to one non-brittle ply is employed. At this ratio, high tensile data are obtained with the specimen consistently fracturing well within the gauge region. With brittle fibers having a tensile strength on the order of 300,000 psi and higher, substantially complete fracture (multiple fracture) of the tensile specimens in the gauge area occurs. At higher ratios of brittle/non-brittle reinforcement plies (above about 2:1), there is insufficient non-brittle reinforcement to prevent fracturing of the pads by the test machine jaws. In particular, in keeping with the provision of a minimum pad thickness to minimize the effect of specimen misalignment, acceptable results have been obtained using two plies of brittle fibers 18¹ and four plies of non-brittle fibers 22 in the pad whereas excellent results have been obtained using four plies of brittle fibers and two plies of non-brittle fibers.

Preparation of the test specimen 10 will now be described with reference to FIG. 3 and 4. A mold comprising a pair of identical mold plates 24,24¹ is employed with each mold plate defining a pair of open-ended cavities 26,26 in communication with each other through an intermediate channel 28 extending therebetween. The bottom surface of each cavity 26 is machined to provide a plurality of steps 30 for the purpose of providing the upper and lower surfaces of the pads 12,12¹, 14,14¹ with the desired "curvature" to minimize stress concentrations. The dimensions of the open-ended cavities 26,26 and intermediate channel 28 are substantially the same as the test specimen 10.

B-staged plies of the materials to be incorporated in the test specimen 10 are cut to the requisite size so that they can be laid up horizontally in a horizontally positioned mold. Thereafter, the plies are laid up in the lower mold plate 24 to a thickness such that when cured under pressure, the required test specimen thickness is obtained. More specifically, glass fiber-resin plies are laid up, for example on the lower two steps 30 of the end cavities 26,26 of the lower mold plate 24. Then brittle fiber-resin plies, for example, four plies, are laid over these to more than fill the cavities 26,26 so that curing under pressure will reduce the thickness of these plies to that of pads 12¹, 14¹. Thereafter, brittle fiber-resin plies having a length substantially equal to that of the channel 28 are laid into the channel to a thickness such that the resulting thickness-reduction during curing will produce a unidirectional laminate 11 of desired thickness. Glass fiber-resin and brittle fiber-resin plies of shorter length are then laid over these full-length brittle fiber-resin plies in reverse order to, but in the same number as, the plies filling the lower mold plate cavities 26,26 to thereby provide the plies for the other pair of pads 12,14. The other mold plate 14 is then placed over these plies and the latter are cured at the requisite temperature and pressure to produce the test specimen 10. To facilitate removal of the latter from the mold plates 24,24¹, the surfaces defining the cavities 26,26 and channels 28 may be precoated with a mold release agent as is well known in the art.

While the test specimen 10 has been described as including a unidirectional laminate 11, it will be understood that the laminate 11 could be a bi-or multidirectional laminate. It will also be understood that the plies comprising the pads also need not be unidirectional. As used herein and in the claims, the term "unidirectional" refers to any laminate or ply which is incorporated in the herein-described specimens and which includes filaments extending in the longitudinal direction of the specimen over at least the length between the pads. That term thus includes bi-and multidirectional laminates which meet the foregoing condition.

This invention will be further described by the following Examples.

EXAMPLE b

The purpose of this test was to determine the tensile strength of a unidirectional graphite fiber-epoxy resin laminate.

Using a mold plate as shown in FIG. 3 and 4, the following B-staged plies, cut to the requisite size, were laid up as follows starting from the lowest layer in contact with the lower mold plate: two plies of glass fiber-epoxy resin (Narmco 1004 epoxy resin reinforced with 181 Fiberglas cloth); four plies of graphite fiber — epoxy resin (Narmco 1004 epoxy resin reinforced with FTI C-3000 graphite unidirectional fibers) to complete one set of pads 12¹, 14¹; seven unidirectional plies of the same graphite-epoxy resin plies of greater length for the unidirectional laminate 11; another four plies of the same graphite-epoxy resin plies and another two plies of the same glass fiber-epoxy resin plies to complete the other pads 12,14. After an upper mold plate was placed over this layup, the latter was cured at 350°F and 100 psi. for 1.5 hours.

Prior to cure, the graphite plies were approximately 0.007–0.008 in. thick and the glass plies were approximately 0.010–0.012 in. thick.

The preceding procedure was employed to produce three test specimens with the intermediate test section 15 having the width and thickness dimensions shown in Table 1. Each specimen was tested at room temperature per McDonnell-Douglas specification DMS–1936 A. The results are shown in Table 1.

TABLE 1

| Specimen | Thick inches | Width inches | Load pounds | Ult. Tensile (KSI) |
|---|---|---|---|---|
| 1 | 0.039 | 0.496 | 2920 | 151.3 |
| 2 | 0.038 | 0.496 | 2840 | 151.1 |
| 3 | 0.040 | 0.496 | 2740 | 138.1 |

Each of the test specimens fractured between the test gauge points showing that good failures were obtained. Because of the relatively low loads required to fracture the specimens, it is possible to obtain approximately the same results as shown in Table 1 using bonded pads if great care is taken to bond the non-integrated load pads to the test laminate. However, in practice, such results are usually not obtainable since it is difficult to obtain a bond between the cured pads and laminate which distributes the applied load over the total area covered by the pads. In contrast, this load distribution problem is substantially eliminated using the herein-described integrated load pads.

EXAMPLE 2

The procedure of Example 1 was repeated except that Courtald A graphite fibers were used in place of the FTI C–3000 graphite fibers.

The data obtained are shown in Table 2.

TABLE 2

| Specimen | Thick. inches | Width inches | Load pounds | Ult. Tensile (KSI) |
|---|---|---|---|---|
| 1 | 0.040 | 0.502 | 3870 | 192.5 |
| 2 | 0.040 | 0.491 | 3970 | 201.0 |
| 3 | 0.039 | 0.501 | 3775 | 192.6 |

Again the specimens fractured between the gauge points indicating that good failures were obtained. The average ultimate tensile of about 195 ksi is higher than that obtained in Example 1 because of the different graphite fibers used. Experience has shown that the average tensile value obtained from Example 2 is also higher than the tensile values which one would expect to be able to consistently obtain using bonded pads. This is because the use of bonded pads decreases repeatability since they increase the chance of (undesired) failure in the pad region.

EXAMPLE 3

This Example illustrates the use of both integratrd load pads with varying ratios of graphite/glass and non-integrated load pads to test the tensile strength of the same unidirectional graphite/epoxy laminates.

Three groups of tensile specimens three specimens in each group) were made up with integrated load pads using the procedure described in Example 1. One group (A) employed Modmor II graphite fibers, Narmco 1004 epoxy resin, and 181 Fiberglas cloth as the constituent materials. The pads included four plies of the graphite reinforcement and two plies of the glass reinforcement. A second group (B) employed the same materials but used two plies of graphite reinforcement and four of glass in the pads. A third group (C) used six plies of glass reinforcement and none of graphite in the pads.

A fourth group (D) employed load pads comprising six plies of 3M's Scotchply glass/epoxy resin. These pads were bonded to the laminates using Narmco's Metlbond M329 which was cured at 350°F and 30 psi for 1 hour.

The specimen test length dimensions are given in Table 3 together with the results of the tests. Each specimen was tested per DMS–1936.

TABLE 3

| Specimen | Thick. inches | Width inches | Load pounds | Ult. Tensile (KSI) |
|---|---|---|---|---|
| A1 | 0.050 | 0.493 | 4360 | 177.2 |
| A2 | 0.049 | 0.503 | 3850 | 156.5 |
| A3 | 0.049 | 0.498 | 5000 | 204.9 |
| B1 | 0.049 | 0.501 | 3430 | 140.1 |
| B2 | 0.049 | 0.501 | 3320 | 135.6 |
| B3 | 0.049 | 0.500 | 3180 | 127.2 |
| C1 | 0.051 | 0.500 | 3520 | 138.0 |
| C2 | 0.050 | 0.500 | 2820 | 112.8 |
| C3 | 0.047 | 0.495 | 3310 | 142.1 |
| D1 | 0.050 | 0.500 | 3350 | 134.0 |
| D2 | 0.049 | 0.492 | 3540 | 146.9 |
| D3 | 0.0495 | 0.508 | 3760 | 149.8 |

Specimen groups A and B represent specimens made according to the herein-described invention, i.e., with integrated load pads and with a graphite/glass ply ratio between about 1:2 and about 2:1. As will be noted from Table 3, group A with a graphite/glass ply ratio of 2:1 gave far superior results as compared to any of the other specimens. In particular, the tensile data obtained from group A was about 25 percent higher than that obtained from group D (bonded pads) even though the laminate material was taken from the same batch of graphite/epoxy material. This superiority was further evidenced by the manner in which the specimens of group A and D fractured. The specimens of group D tended to fracture along the line where the pads tapered into the laminate and they tended to fail in shear along the bond line between the pads and laminate. In contrast, each of the specimens of group A shattered simultaneously in many places in the laminate between the pads. This is because the integrated pads described herein permit the buildup of very high forces in the laminate so that when it breaks, it does so in many places at once.

A comparison of the data from the specimens of group A with that of the specimens of group C shows that integration alone is not the total solution to the problem since the pads of both these groups are integrated. However, the pads of group C do not contain any brittle (in this case graphite) fibers whereas those of group A do. Again the tensile data obtained from group A specimens is about 39% higher then the data obtained from group C specimens. This is apparently because there is little carry-over or continuity of laminate characteristics into the load pads of group C as there is in group A. It was also noted that the group C specimens broke in a manner similar to those of group D.

The specimens of group B did not produce high results as were obtained from the group A specimens. However, this is to be explained in part by the fact that somewhat inferior materials were used in making the specimens. These data are also explained by the fact that the ratio of graphite/glass plies in the pads of 1:2 represents a lower limit of graphite/ glass. Thus, the data from the group B specimens are more illustrative than comparative.

I claim:

1. A tensile test specimen for use in testing high-strength, brittle fibers comprising:

A unidirectional laminate comprising a plurality of brittle fiber-reinforced resin plies, said laminate having oppositely facing surfaces of a width greater than its thickness; and discrete pads formed integral with said laminate for gripping by the jaws of a test machine with a pair of said pads being disposed on each said laminate surface adjacent the ends thereof to leave exposed sections of said surfaces between said pads on each of said surfaces for fracturing when said specimen is subjected to tensile loading, each of said pads comprising a plurality of plies of substantially the same resin as in said laminate reinforced by said high-strength brittle fibers and by non-brittle fibers, the ratio of said brittle fiber-reinforced plies to said non-brittle fiber reinforced plies being between about 1:2 and about 2:1, said brittle fiber-reinforced plies being disposed between said non-brittle fiber-reinforced plies and said laminate, the plies in each of said pads having differing surface areas and being arranged in order of size with the ply having the largest area in each pad being disposed on the unidirectional laminate to minimize stress concentration.

2. The tensile specimen of claim 1 wherein said brittle fibers are selected from the group consisting of graphite and boron.

3. The tensile test specimen of claim 2 wherein said high-strength, non-brittle fibers are glass fibers.

4. The tensile test specimen of claim 1 wherein said ratio is about 2:1.

5. The tensile test specimen of claim 1 wherein each said pad is formed from six fiber-reinforced plies.

6. The tensile test specimen of claim 5 wherein the thickness of said laminate is about 0.04 in. to about 0.05 in.

7. A tensile test specimen for use in testing high-strength brittle fibers comprising:

a unidirectional laminate comprising a plurality of fiber-reinforced resin plies, said fiber being selected from the group consisting of graphite and boron fibers and said laminate having width-defining surfaces of a width greater than its thickness; and discrete pads formed integral with said laminate for gripping by the jaws of a tensile test machine with a pair of said pads being disposed on each said laminate surface adjacent the ends thereof to leave exposed sections of said surfaces between said pads on each of said surfaces for fracturing when subjecting said specimen to tensile loading, each of said pads comprising a plurality of plies of substantially the same resin as in said laminate reinforced with one of said graphite and boron fibers and with glass fibers, the ratio of said graphite/boron-reinforced plies to said glass-reinforced plies being between about 1:2 and about 2:1, said graphite/boron-reinforced plies being disposed between said laminate and said glass-reinforced plies, the plies in each of said pads having differing surface areas and being arranged in order of size with the ply having the largest area in each pad being disposed on the unidirectional laminate to minimize stress concentration.

8. The tensile test specimen of claim 7 wherein the total number of said graphite/boron reinforced plies and said glass-reinforced plies is six.

9. The tensile test specimen of claim 8 wherein said ratio is about 2:1.

10. The tensile test specimen of claim 8 wherein said laminate has a thickness of about 0.04 in. to about 0.05 in.

* * * * *